July 23, 1929.                H. A. ZIOLA                1,721,582

VARIABLE HEAT CONTROL MEANS FOR ELECTRICAL HEATERS

Filed June 11, 1927

Inventor
Henry A. Ziola

By Robb & Robb
Attorneys

Patented July 23, 1929.

1,721,582

UNITED STATES PATENT OFFICE.

HENRY A. ZIOLA, OF TOLEDO, OHIO, ASSIGNOR TO THE SWARTZBAUGH MANUFACTURING COMPANY, OF TOLEDO, OHIO, A CORPORATION.

VARIABLE HEAT-CONTROL MEANS FOR ELECTRICAL HEATERS.

Application filed June 11, 1927. Serial No. 198,148.

Heretofore in the use of resistance units to supply heat for the ovens of electric ranges, or heat generally for other appliances where heat generated by electricity is desired, considerable difficulty has been experienced in obtaining suitable variations of the temperature supplied. The operation of electric stoves has been very expensive due to the waste of heat that is not needed. The lowering of the temperature of the heater has not, as a rule, resulted in any substantial saving in the current.

This invention has for its primary object the provision of resistance units that heat the oven of a range or heater, or to supply heat wherever desired in such an arrangement that various units may be cut out or put in parallel with other units to vary the resulting temperature.

A further object of this invention is to provide an arrangement of resistance units used in an electric heater, such as may be easily connected or disconnected to a current supply line in various ways to afford a change in the temperature of the heater. By arranging the resistance units so as only the actual amount of current used in supplying the needed heat may be obtained, great saving in the electricity used is afforded by eliminating the wastage of current.

In carrying out the invention a pair of plugs connected to lead in cords, or the like, are supplied to afford the connection between the units and the current supply line. These plugs are to be attached to various terminals connected to the resistance heating units in the manner desired. Inasmuch as these plugs may be connected to the terminals, either individually or collectively, and in various manners, several combinations of the resistance units used are possible.

A still further object of the invention is to arrange electrical heating elements in the heating compartment of the oven of an electric stove or heater in such a manner as to evenly heat the oven at low temperatures, thus providing a much more efficient oven for cooking purposes.

In carrying out the present embodiment of the invention, four resistance units, 1, 2, 3 and 4 are employed. The units 1 and 2 are connected together as a pair, and so are the units 3 and 4, forming two pairs of resistance units. These pairs of units are connected by the conductor 5.

The resistance units used may be of any desirable metal having high resistant properties, such as a nickel chromium element, or German silver. The conductor 5 is made of any good conductor of electricity, such as copper. At the free ends of each of the resistance units are the terminals 6, there being a terminal on the end of each unit. These terminals are adapted to be detachably engaged by the ordinary plug for connection to a current supply line.

Figure 1:
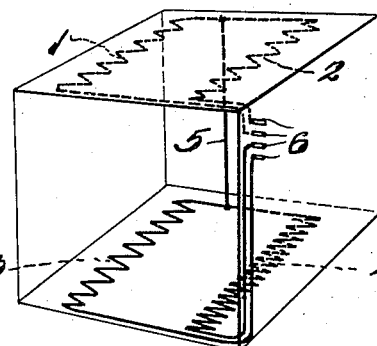
Figure 1 is a perspective of the inside of an oven with resistance units placed therein in accordance with the invention.
Figure 2:
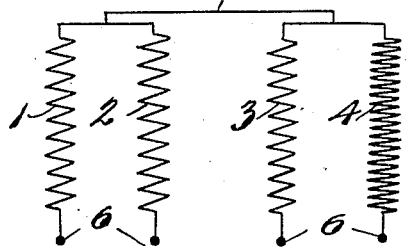
Figure 2 is a diagram showing an arrangement of the resistance units for general use.

In Figure 1 I have shown the electrical heating elements in this case resistance units, arranged in the oven of the electric stove or range, the units 1 and 2 being in the top thereof and the units 3 and 4 in the bottom. Terminals 6 are grouped together along one side of the oven to facilitate their plugging in. The top units are connected to the bottom units by the conductor 5.

It may be readily seen that when one element or unit in the top is employed, in conjunction with one element or unit in the bottom of the heating compartment of the oven that the heat is more evenly supplied throughout the compartment and that any substance inside of the oven being cooked would receive the heat equally from the top and bottom, which is highly desirable for cooking purposes.

Figure 3:
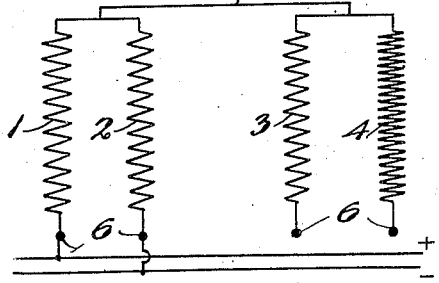
Figures 3, 4 and 5 are diagrams showing how the units are connected to a current supply line when one plug is used.
Figure 4:
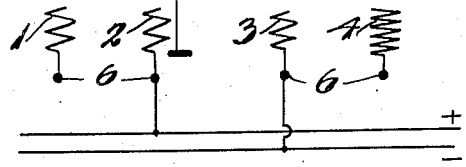
Figure 5:
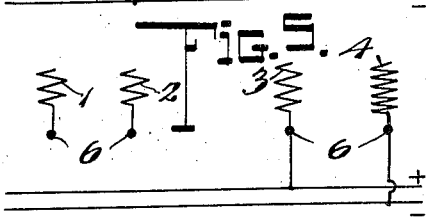
Figure 6:
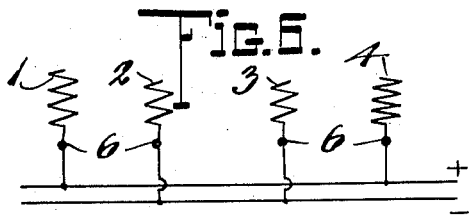
Figures 6, 7, 8 and 9 are diagrams showing the hook-ups of the resistance units to the current supply line when two plugs are used.
Figure 7:
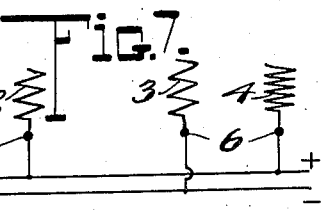
Figure 8:
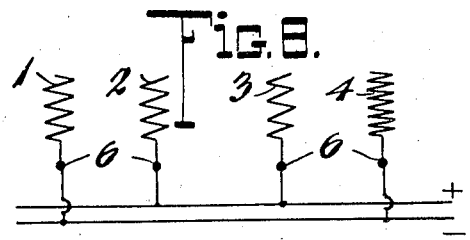
Figure 9:
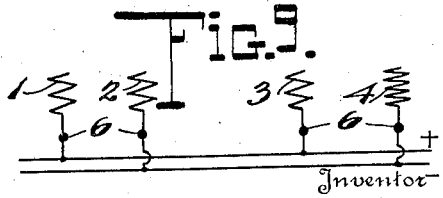

In carrying out the present invention as applied to the oven of an electric stove, the resistance unit 4 has a resistance of about 51½ ohms, while the resistance of each of the units 1, 2 and 3, is about 8½ ohms. Of course, the strength of these resistances may vary as desired, the present figure being merely taken for the purpose of illustration. If the customary supply line having a potential of 110 volts is used with one plug connecting the units 1 and 2, as shown in Figure 3, to the line, there are about 680 watts used in heating the oven. This is also true when the units 2 and 3 are connected to the line as shown in Figure 4. However, when the units 3 and 4 are connected to the line as shown in Figure 5, there are only 195 watts used in supplying heat to the oven, this being due to the greater resistance of the unit 4. These are some of the possible ways in which the units could be connected to the main line employing one plug with the terminals arranged in a row as shown in Figure 1.

It may be noted that when only one plug is used, only two of the units are brought into service. However, when a higher temperature is desired in the oven, all four of the units may be brought into service by employing two plugs for their connection to the supply line.

As shown in Figures 6, 7, 8 and 9 there are at least four possible ways in which the units may be connected to the current supply line by using two plugs. However, all of these hook-ups give exactly the same result. It will be seen that the resistance of the entire circuit is the same as resistance units 1 and 2 in series-parallel, plus resistance of the units 3 and 4 in series-parallel, that is, about 11½ ohms. Therefore, when the potential of 110 volts is employed, approximately 1000 watts are used in heating the oven.

We find that there are three temperatures obtainable in the oven by the use of these units. When one plug is employed the resistance units 1 and 2 give one temperature. By employing one plug with the units 3 and 4 a lower temperature is afforded. Then, by using both the plugs we have a higher temperature than afforded by the use of either one of the plugs.

It will be apparent, therefore, that considerable nicety of control of the temperature of any compartment of a heater, or oven stove, is secured in the carrying out of this invention, and wastage of heat and expensive electric current so commonly supplied beyond the requirements of use are avoided.

What I claim as new, and desire to cover by Letters Patent of the United States, is:

1. An oven comprising a heating compartment, a plurality of electrical heating elements spaced in the top and bottom portions of the said heating compartment, connector elements adapted to join one end of each of the said heating elements, and means for varying the temperature of the oven, said means comprising terminal plugs connected to the free ends of the said heating elements, said terminal plugs adapted to be selectively cooperative with standard terminal sockets for connecting the said heating elements in different combinations, depending on the degree of heat desired in the oven.

2. In an electric heating oven, a plurality of heating elements located in the top portion and another plurality of heating elements located in the bottom portion of said oven, a common conductor joining together one end of each of the said heating elements, and a plurality of uniformly spaced terminal plugs, each of which is connected to the free end of one heating element, certain of said terminal plugs being adapted to be engaged by a standard terminal socket for establishing electrical connection with certain of the heating elements in the top of the oven, certain others of the terminal plugs being adapted to be engaged by a standard socket for establishing electrical connection with heating elements in the bottom of the oven, certain of these terminal plugs adapted to be engaged by a standard socket to establish electrical connection with certain of the heating elements in the top and bottom of the oven, and said terminal plugs being adapted to be engaged by a plurality of standard sockets for establishing electrical connection with all of the heating elements in the top and bottom of the oven simultaneously.

In testimony whereof I affix my signature.

HENRY A. ZIOLA.